United States Patent [19]

Nouvertné et al.

[11] Patent Number: 4,539,370
[45] Date of Patent: Sep. 3, 1985

[54] THERMOPLASTIC MOULDING COMPOSITIONS

[75] Inventors: Werner Nouvertné, Krefeld; Wolfgang Stix, Neckarsteinach, both of Fed. Rep. of Germany

[73] Assignee: Bayer Aktiengesellschaft, Leverkusen, Fed. Rep. of Germany

[21] Appl. No.: 631,635

[22] Filed: Jul. 17, 1984

[30] Foreign Application Priority Data

Jul. 28, 1983 [DE] Fed. Rep. of Germany ....... 3327273
Oct. 13, 1983 [DE] Fed. Rep. of Germany ....... 3337295

[51] Int. Cl.$^3$ .............................................. C08L 69/00
[52] U.S. Cl. ........................................ 525/67; 525/92; 525/146; 525/147; 525/148; 525/425; 525/433

[58] Field of Search ................. 525/425, 439, 67, 148, 525/433, 147, 146, 92

[56] References Cited

U.S. PATENT DOCUMENTS 4,250,279 2/1981 Robeson et al. .................... 525/425
4,430,484 2/1984 Quinn ................................ 525/425

Primary Examiner—Theodore E. Pertilla
Attorney, Agent, or Firm—Connolly and Hutz

[57] ABSTRACT

The present invention relates to thermoplastic moulding compositions of (A) thermoplastic polycarbonates, mixed with (B) thermoplastic polyalkylene terephthalates and, if appropriate, with (C) elastomeric polymers, which are characterized in that they contain (D) a thermoplastic based on a polyether-imide.

11 Claims, No Drawings

THERMOPLASTIC MOULDING COMPOSITIONS

The present invention relates to thermoplastic moulding compositions containing (A) 95 to 50 parts by weight of thermoplastic, aromatic polycarbonates with weight-average molecular weights $\overline{M}_w$ between 10,000 and 200,000 ($\overline{M}_w$ determined by means of light scattering), (B) 50 to 5 parts by weight of thermoplastic polyalkylene terephthalate and, if appropriate, (C) 0 to 30, preferably 1 to 20 and in particular 3 to 15, parts by weight of an elastomeric polymer with a glass transition temperature of less than $-20°$ C., the sum of the parts by weight of (A)+(B)+(C) in each case being 100 parts by weight, characterised in that the polycarbonate component (A) contains 1 to 20% by weight, preferably 1 to 16% by weight and in particular 2 to 10% by weight, based on the sum of (A)+(D), of a thermoplastic (D) based on a polyether-imide.

COMPONENTS (A) TO (D)

Component (A)

In the context of this invention, aromatic polycarbonates (A) are understood as the known homopolycarbonates, copolycarbonates and mixtures of these polycarbonates which are based on, for example, at least one of the following diphenols: hydroquinone, resorcinol, dihydroxydiphenyls, bis-(hydroxyphenyl)-$C_1$–$C_8$-alkanes, bis-(hydroxyphenyl)-$C_5$–$C_6$-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and $\alpha, \alpha'$-bis-(hydroxyphenyl)-diisopropylbenzenes.

These and other suitable diphenols are described, for example, in U.S. Pat. Nos. 3,028,365, 3,275,601, 3,148,172, 3,062,781, 2,991,273 and 2,999,846.

Examples of preferred diphenols are 4,4'-dihydroxydiphenyl, 2,4-bis-(4-hydroxyphenyl)-2-methylbutane, $\alpha, \alpha'$bis-(4-hydroxyphenyl)-p-diisopropylbenzene, bis-(4-hydroxyphenyl) ether, bis-(4-hydroxyphenyl) sulphone and bis-(4-hydroxyphenyl) ketone.

Examples of particularly preferred diphenols are: 2,2-bis-(4-hydroxyphenyl)-propane, bis-(hydroxyphenyl)methane, bis-(4-hydroxyphenyl) sulphone and 1,1-bis-(4-hydroxyphenyl)-cyclohexane.

The aromatic polycarbonates (A) can be branched by incorporation of small amounts, preferably 0.05 to 2.00 mol % (based on the diphenols employed), of compounds which are trifunctional or more than trifunctional, for example those with three or more than three phenolic hydroxyl groups.

The aromatic polycarbonates (A) should as a rule have average molecular weights $\overline{M}_w$ of 10,000 to 200,000, preferably 20,000 to 80,000, determined by light scattering.

Small amounts of low molecular weight polycarbonates, for example with an average degree of polycondensation of 2 to 20, can also be admixed to the high molecular weight polycarbonates with $\overline{M}_w$ of 10,000 to 200,000.

Chain stoppers, such as, for example, phenol, halogenophenols or alkylphenols, are used in a known maner in the calculated amounts to adjust the molecular weight $\overline{M}_w$ of the polycarbonates (A).

The polycarbonates (A) to be used according to the invention are prepared in a known manner, either by the phase boundary process or by the process in a homogeneous solution (pyridine process), or, where relevant, by the melt transesterification process.

Component (B)

Polyalkylene terephthalates (B) in the context of the invention are reaction products of aromatic dicarboxylic acids or their reactive derivatives (for example dimethyl esters) and aliphatic, cycloaliphatic or araliphatic diols and mixtures of these reaction products.

Preferred polyalkylene terephthalates (B) can be prepared from terephthalic acid (or its reactive derivatives, for example dimethyl terephthalate) and aliphatic or cycloaliphatic diols with 2–10 C atoms by known methods (Kunststoff-Handbuch (Plastics Handbook), Volume VIII, page 695 et seq., Carl Hanser Verlag, Munich 1973).

Preferred polyalkylene terephthalates (B) contain at least 80 mol %, preferably at least 90 mol %, based on the dicarboxylic acid component, of terephthalic acid radicals and at least 80 mol %, preferably at least 90 mol %, based on the diol component, of ethylene glycol radicals and/or butane-1,4-diol radicals.

The preferred polyalkylene terephthalates (B) can contain, in addition to terephthalic acid radicals, up to 20 mol % of radicals of other aromatic or cycloaliphatic dicarboxylic acids with 8–14 C atoms or aliphatic dicarboxylic acids with 4–12 C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azeleic acid or cyclohexanediacetic acid.

The preferred polyalkylene terephthalates (B) can contain, in addition to ethanediol radicals or butane-1,4-diol radicals, up to 20 mol % of other aliphatic diols with 3–12 C atoms or cycloaliphatic diols with 6–21 C atoms, for examples radicals of propane-1,3-diol, 2-ethyl-propane-1,3-diol, neopentylglycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3- or 1,6-diol, 2-ethylhexane-1,3-diol, 2,2-diethylpropane-1,3-diol, hexane-2,5-diol, 1,4-di-($\beta$-hydroxyethoxy)-benzene, 2,2-bis-(4-hydroxycyclohexane)propane, 2,4-dihydroxy-1,1,3,3-tetramethylcyclobutane, 2,2-bis-(3-$\beta$-hydroxy-ethoxyphenyl)-propane and 2,2-bis(4-hydroxypropoxy-phenyl)-propane (DE-OS (German Published Specification) Nos. 2,407,674, 2,407,776 and 2,715,932).

The polyalkylene terephthalates (B) can be branched by incorporation of relatively small amounts of trihydric or tetrahydric alcohols or tribasic or tetrabasic carboxylic acids, such as are described, for example, in DE-OS (German Published Specification) No. 1,900,270 and U.S. Pat. No. 3,692,744. Examples of preferred branching agents are trimesic acid, trimellitic acid, trimethylol-ethane or -propane and pentaerythritol.

It is advisable to use not more than 1 mol % of the branching agent, based on the acid component.

Particularly preferred polyalkylene terephthalates (B) are those which have been prepared solely from terephthalic acid or reactive derivatives thereof (for example dialkyl esters thereof) and ethylene glycol and/or butane-1,4diol, and mixtures of these polyalkylene terephthalates.

Other preferred polyalkylene terephthalates (B) are copolyesters which are prepared from at least two of the abovementioned acid components and/or from at least two of the abovementioned alcohol components; particularly preferred copolyesters are poly-(ethylene glycol/butane-1,4-diol) terephthalates.

The polyalkylene terephthalates preferably used as component (B) in general have an intrinsic viscosity of 0.4 to 1.5 dl/g, preferably 0.5–1.3 dl/g and in particular 0.6–1.2 dl/g, in each case measured in phenol/o-dichlorobenzene (1:1 parts by weight) at 25° C.

Component (C)

Elastomeric polymers (C) which can be used according to the invention include copolymers, in particular graft copolymers, which have glass transition temperatures below −20° C. and are obtainable essentially from at least two of the following monomers: chloroprene, butadiene, isoprene, isobutene, styrene, acrylonitrile, ethylene, propylene, vinyl acetate and (meth)acrylates with 1–18 C atoms in the alcohol component; that is to say polymers such as are described, for example, in "Methoden der Organischen Chemie" ("Methods of organic Chemistry"), (Houben-Weyl), Volume 14/1, Georg Thieme Verlag, Stuttgart 1961, pages 393–406, and in C. B. Bucknall, "Toughened Plastics", Appl. Science Publishers, London 1977. Preferred polymers (C) have a gel content of more than 20% by weight, preferably more than 40% by weight.

Preferred polymers (C) are ethylene/vinyl acetate copolymers with 15–45% by weight of vinyl acetate radicals and melt indices from not flowable to 1000, preferably from 0.1 to 20, measured at 190° C. and under a 2.16 kp load according to DIN 53,735.

Examples of preferred polymers (C) are the socalled EPM and EPDM rubbers in which the weight ratio of ethylene radicals to propylene radicals is in the range from 40:60 to 65:35.

The Mooney viscosities (ML1+4/100° C.) of the non-crosslinked EPM or EPDM rubbers are between 25 and 100, preferably between 35 and 90. The gel contents of the non-crosslinked EPM or EPDM rubbers are below 1% by weight.

The ethylene/propylene copolymers (EPM) used have virtually no double bonds, whilst the ethylene/propylene diene terpolymers (EPDM) can have 1–20 double bonds/1000 C atoms. Examples which may be mentioned of suitable diene monomers in the EPDM are: conjugated dienes, for example isoprene and butadiene, and non-conjugated dienes with 5–25 C atoms, for example 1,4-pentadiene, 1,4-hexadiene, 1,5-hexadiene, 2,5-dimethyl-1,5-hexadiene and 1,4-octadiene; cyclic dienes, for example cyclopentadiene, cyclohexadiene, cyclooctadiene and dicyclopentadiene; alkenylnorbornenes, for example 5-ethyldiene-2-norbornene, 5-butyl-diene-2-norbornene, 2-methallyl-5-norbornene and 2-isopropenyl-5-norbornene, and tricyclodienes, for example 3-methyl-tricyclo-(5,2,1,0,2,6)-3,8 decadiene. The non-conjugated dienes hexadiene-1,5,ethylidenenorbornene and dicyclopentadiene may be mentioned as preferred. The diene content in the EPDM is preferably 0.5–10% by weight.

Such EPM and EPDM rubbers are described, for example, in DE-OS (German Published Specification) No. 2,808,709.

Other preferred polymers (C) are selectively hydrogenated block copolymers of a vinylaromatic monomer (X) and a conjugated diene (Y) of the X-Y type. These block copolymers can be prepared by known processes. In general, for preparation of the suitable X-Y block copolymers from styrene, α-methylstyrene, vinyltoluene and the like and from conjugated dienes, such as butadiene, isoprene and the like, the technology which is used for the preparation of styrene/diene block copolymers and which is described in "Encyclopedia of Polymer Science and Technology", Volume 15, Interscience, N.Y. (1971), on pages 508 et seq., can be applied. The selective hydrogenation can be carried out by routes which are known per se, and means that the ethylenic double bonds are essentially completely hydrogenated, the aromatic double bonds essentially remaining uninfluenced. Such selectively hydrogenated block copolymers are described, for example, in DE-OS (German Published Specification) No. 3,000,282.

Examples of preferred polymers (C) are polybutadienes, butadiene/styrene copolymers and poly-(meth)acrylates which are grafted with styrene and/or acrylonitrile and/or alkyl(meth)acrylates, for example also copolymers of styrene or alkylstyrene and conjugated dienes (high impact polystyrene), that is to say copolymers of the type described in DE-OS (German Published Specification) No. 1,694,173 (=U.S. Pat. No. 3,564,077); examples of other preferred graft polymers (C) are polybutadienes, butadiene/styrene copolymers, butadiene acrylonitrile copolymers, polyisobutenes or polyisoprenes grafted with acrylates or methacrylates or with vinylacetate or with acrylonitrile or with styrene or with alkylstyrenes, such as are described, for example, in DE-OS (German Published Specification) No. 2,348,377 (=U.S. Pat. No. 3,919,353).

Examples of particularly preferred polymers (C) are ABS polymers, such as are described, for example, in DE-OS (German Published Specification) No. 2,035,390 (=U.S. Pat. No. 3,644,574) or in DE-OS (German Published Specification) No. 2,248,242 (=British Patent specification No. 1,409,275).

Examples of particularly preferred polymers (C) are graft polymers which are obtainable by a grafting reaction of I. 10–40% by weight, preferably 10–35 and in particular 15–25% by weight, based on the graft product, of at least one (meth)acrylate and/or a mixture of 10–35% by weight, preferably 20–35% by weight, based on the mixture, of acrylonitrile and 65–90% by weight, preferably 65–80% by weight, based on the mixture, of styrene on II. 60–90% by weight, preferably 65–90 and in particular 75–85% by weight, based on the graft product, of a butadiene polymer with at least 70% by weight, based on II, of butadiene radicals as the graft base, where, preferably, the gel content of the graft base II is $\geq 70\%$ (measured in toluene), the degree of grafting G is 0.15 to 0.55 and the average particle diameter $d_{50}$ of the graft polymer (C) is 0.2 to 0.6 μm, preferably 0.3 to 0.5 μm.

(Meth)acrylates I are esters of acrylic acid or methacrylic acid and monohydric alcohols with 1 to 8 C atoms.

The graft base II can contain, in addition to butadiene radicals, up to 30% by weight, based on II, of radicals of other ethylenically unsaturated monomers, such as, for example, styrene, acrylonitrile or esters of acrylic or methacrylic acid with 1–4 C atoms in the alcohol component (such as methylacrylate, ethyl acrylate, methyl methacrylate and ethyl methacrylate). The preferred graft base II consists of pure polybutadiene.

Since, as is known, the graft monomers I are not completely grafted onto the graft base II in the grafting reaction, the graft polymers (C) to be used according to the invention also contain, in addition to the actual grafted polymers, homopolymers and, where relevant, copolymers of the graft monomers I used for grafting.

The degree of grafting G designates the weight ratio of grafted-on graft monomers to the graft base and is dimensionless.

The average particle size $d_{50}$ is the diameter above and below which in each case 50% of the particles lie. It can be determined by means of ultra-centrifuge measurements (W. Scholtan, H. Lange, Kolloid. Z. und Z. Polymere 250 (1972), 782–796), or by means of electron microscopy and subsequent particle counting (G. Kämpf, H. Schuster, Angew. Makromolekulare Chemie 14, (1970), 111–129) or by means of light scattering measurements.

Examples of other particularly preferred polymers (C) are graft polymers of (a) 25–98% by weight, based on the graft polymer (C), of acrylate rubber with a glass transition temperature below $-20°$ C., as the graft base, and (b) 2–75% by weight, based on the graft polymer (C), of at least one polymerisable ethylenically unsaturated monomer, the homopolymers of which formed in the absence of (a) or the copolymers of which would have a glass transition temperature above 25° C., as graft monomers.

The acrylate rubbers (a) of the polymers (C) are preferably polymers of alkyl acrylates, if appropriate with up to 40% by weight of other polymerisable ethylenically unsaturated monomers. If the acrylate rubbers (as described on page 10 below) used as the graft base (a) in turn are already graft products with a diene rubber core, the diene rubber core is not taken into consideration in the calculation of this percentage. Preferred polymerisable acrylates include $C_1$–$C_8$-alkyl esters, for example, methyl, ethyl, butyl, octyl and 2-ethylhexyl esters; halogenoalkyl esters, preferably halogeno-$C_1$–$C_8$-alkyl esters, such as chloroethyl acrylate, and aromatic esters, such as benzyl acrylate and phenethyl acrylate. They can be used individually or as a mixture.

The acrylic rubbers (a) can be non-crosslinked or crosslinked, and are preferably partially crosslinked.

Monomers with more than one polymerisable double bond can be copolymerised for crosslinking. Preferred examples of crosslinking monomers are esters of unsaturated monocarboxylic acids with 3 to 8 C atoms and unsaturated monohydric alcohols with 3–12 C atoms or saturated polyols with 2–4 OH groups and 2–20 C atoms, such as, for example, ethylene glycol dimethacrylate or allyl methacrylate; and also polyunsaturated heterocyclic compounds, such as, for example, trivinyl and triallyl cyanurate and isocyanurate and tris-acryloyl-s-triazines, as well as polyfunctional vinyl compounds, such as di- and tri-vinylbenzenes; and furthermore triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and the triallylbenzenes.

The amount of crosslinking monomers is preferably 0.02 to 5% by weight, in particular 0.05 to 2% by weight, based on the graft base (a).

In the case of cyclic crosslinking monomers with at least three ethylenically unsaturated groups, it is advantageous to restrict their amount to 1% by weight of the graft base (a).

Preferred "other" polymerisable ethylenically unsaturated monomers which, in addition to the acrylates, can, if appropriate, be used for the preparation of the graft base (a) are, for example, acrylonitrile, styrene, α-methylstyrene, acrylamides and vinyl-$C_1$–$C_6$-alkyl ethers. Preferred acrylate rubbers as the graft base (a) are emulsion polymers which have a gel content of 60% by weight.

The gel content of the graft base (a) is determined at 25° C. in dimethylformamide (M. Hoffmann, H. Krömer and R. Kuhn, Polymeranalytik I und II (Polymer Analysis I and II), Georg Thieme Verlag, Stuttgart 1977).

Acrylate rubbers as the graft base (a) can also be products which contain, as the core, a crosslinked diene rubber of one or more conjugated dienes, such as polybutadiene, or a copolymer of a conjugated diene and an ethylenically unsaturated monomer, such as styrene and/or acrylonitrile.

The content of the polydiene core in the graft base (a) can be 0.1 to 80% by weight, preferably 10–50% by weight, based on (a). The shell and core can be non-crosslinked, partly crosslinked or highly crosslinked, independently of one another.

The following may be summarised as particularly preferred graft bases (a) for graft polymers (C) based on polyacrylates: 1. acrylate polymers and copolymers without a diene rubber core and 2. acrylate polymers and copolymers containing a diene rubber core.

The grafting yield, that is to say the quotient of the amount of grafted-on monomer (b) and the amount of graft monomer (b) employed, is as a rule 20 to 80% by weight. The determination can be carried out as described in M. Hoffmann, H. Krömer and R. Kuhn, Polymeranalytik (Polymer Analysis), Volume 1, Georg Thieme Verlag, Stuttgart 1977.

Preferred graft monomers (b) are α-methylstyrene, styrene, acrylonitrile, methyl methacrylate or mixtures of these monomers. Preferred graft monomer mixtures are those of styrene and acrylonitrile in a weight ratio of 90:10 to 50:50.

Such graft polymers (C) based on polyacrylates are described, for example, in DE-AS (German Published Specification) No. 2,444,584 (=U.S. Pat. No. 4,022,748) and in DE-OS (German Published Specification) No. 2,726,256 (=U.S. Pat. No. 4,096,202).

Particularly advantageous graft polymers of this type are obtained when 2–20% by weight, preferably 2–15% by weight, based on (C), of monomer (b) is grafted onto 80–98% by weight, preferably 85–97% by weight, based on (C), of the completely broken latex of (a) suspended in water, in the absence of a suspending agent. The pulverulent graft polymer obtained can then be dried and homogenised with other components in the desired ratio, under the action of shearing forces, such that the average particle size $d_{50}$ of (C) in the mixture according to the invention is 0.05 to 3 μm, preferably 0.1 to 2 μm and in particular 0.2 to 1 μm.

The expression "in the absence of a suspending agent" means the absence of substances which could suspend the graft monomers (b) in the aqueous phase, according to the type and amount. The definition does not exclude the presence of substances which, for example, have had a suspending effect during the preparation of a grafted graft base (a); in such cases, the coagulating agent or precipitant used for breaking the latex (a) must be added in an amount which compensates the suspending action of the substances employed in the preliminary stage; in other words: it must be ensured that the graft monomers (b) do not give any (stable) emulsion in the aqueous phase.

A graft polymer (C) prepared in this manner in the absence of a suspending agent can, as a constituent of the moulding compositions according to the invention, be dispersed in the other resin components to give an exceptionally low particle size which survives even prolonged processing times at elevated temperature relatively unchanged.

The expression "exceptionally low particle size" means that the number, shape and size of the graft polymer particles to be used essentially still match the number, shape and size of the graft polymer particles introduced into the other molten resin components, even after the homogenisation.

Acrylate rubbers which are obtained as an aqueous emulsion (latex) and in which the latex particles contain 1–20% by weight, preferably 1–10% by weight, based on (a), of monomers which are already grafted on in aqueous emulsion and of which the homopolymers or copolymers would have glass transition temperatures of >0° C., can also be used as the graft base (a).

Preferred grafted-on monomers of this type are alkyl acrylates, alkyl methacrylates, styrene, acrylonitrile, α-methylstyrene and/or vinyl acetate.

Such polymer bases (a) are prepared, for example, by emulsion polymerisation or grafting emulsion polymerisation. However, they can also be prepared by preparing an acrylate rubber in solution or bulk, subsequently grafting the graft monomers and then converting these rubbers into an aqueous emulsion which is suitable for further grafting processes.

Preferred suitable graft bases (a) for acrylate rubbers of this particular embodiment are thus also, in addition to the polymers listed on page 8, graft polymers prepared in aqueous emulsion from acrylate polymers or copolymers, which contain, if appropriate, a diene rubber core, and ethylenically unsaturated polymerisable monomers.

Component (D)

The thermoplastics based on a polyether-imide which are to be used according to the invention are those with structural units of the formula (I)

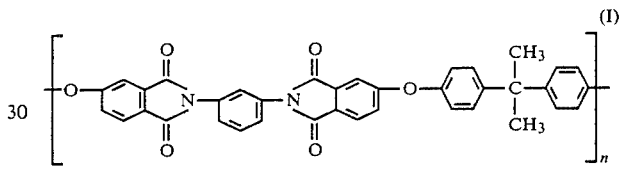

wherein "n" is the degree of polymerisation, which corresponds to a number-average molecular weight ($\overline{M}_n$) of between 10,000 and 50,000 g/mol.

The thermoplastic polyether-imides have a high heat distortion point; they have a Vicat heat distortion point of greater than 200° C., measured according to DIN 53,450.

In principle, the polyether-imides can be prepared by various processes using various intermediates. A customary process uses N-methylphthalimide as the starting substance. This is nitrated in the 3-position and reacted with the disodium salt of bisphenol, A, BPA (bis-n-methylphthalimide)-ether being formed. This is subjected to a condensation reaction with m-phenylenediamine to give the high molecular weight polyether-imide. A monofunctional amine, for example stearylamine, can also be used to regulate the molecular weight. Another synthesis process starts with the reaction of 3-nitrophthalic anhydride with m-phenylenediamine, followed by a condensation reaction with the disodium salt of bisphenol A. Monofunctional phenols are advantageously used here as molecular weight regulators.

Further details are given, for example, in U.S. Pat. No. 3,838,097. An example of a polyether-imide is the commercially available "Ultem 1000 TM ®" from Messrs. General Electric.

On the prior art

Components (A) to (D) are known as such.

Mixtures of polycarbonates and polyesters are also known (see, for example, German Patent Specification No. 1,187,793, DE-AS (German Published Specification) No. 1,694,124 and DE-OS (German Published Specification) No. 2,622,414.

Mixtures of polyesters and grafted polymers are likewise known (see, for example, U.S. Pat. Nos. 3,919,353 and 3,564,077, DE-OS (German Published Specification) No. 2,659,338 or U.S. Pat. No. 4,096,202 and DE-OS (German Published Specification) No. 2,726,256).

Mixtures of polycarbonates and polymers are likewise known (see, for example, Japanese Patent Publication No. 18611/68 (Teijin, priority 30.6.1965), U.S. Pat. Nos. 3,663,471, 3,437,631, 4,299,928, or DE-OS (German Published Specification) No. 3,114,494).

Mixtures of polycarbonates, polyesters and grafted polymers are likewise known (see, for example, U.S. Pat. No. 3,864,428 or DE-AS (German Published Specification) No. 2,343,609, or U.S. Pat. No. 4,264,487 or EU-OS (European Published Specification) No. 25,920, or U.S. Pat. No. 4,257,937 or EU-OS (European Published Specification) No. 20,605 or WO No. 80/00972, or German Patent Specification No. 1,569,448 or British Pat. No. 1,007,724.

Although moulding compositions of polycarbonates, polyesters and elastomeric polymers have many positive properties, they do not meet some specific requirements. On prolonged exposure to heat, for example during lacquering, shaped articles, especially thin shaped articles, produced therefrom tend to display distortion phenomena.

An increase in the heat distortion point of such moulding compositions to, where possible, above 120° C. is thus an urgent technical need. However, the physical and chemical properties of polycarbonate/polyalkylene terephthalate mixtures, which are known to be good, should at the same time be largely retained.

Thermoplastic moulding compositions which are based on polycarbonate, polyalkylene terephthalate and, where relevant, one or more polymers and of which the distortion properties are influenced in an exceptionally positive manner by the presence of small amounts of o,o,o',o'-tetramethylbisphenol polycarbonate are indeed known from DE-OS (German Published Specification) No. 3,118,697. However, these mixtures have the disadvantage that their toughness is significantly impaired by the presence of the o,o,o',o'-tetramethylbisphenol polycarbonate.

The mixture according to the invention does not have this disadvantage.

The significant increase in the Vicat temperature of the mixture according to the invention with the result of substantially improved distortion properties is surprising, because the heat distortion point of polycarbonate is only insignificantly increased solely by the addition of polyether-imide.

As a result of the polyether-imide additive, the shaped articles produced from the moulding compositions according to the invention do not distort even at temperatures up to 130° C. The mouldings can therefore be lacquered with suitable lacquering systems without problems and can be used on motor vehicles as external components which are resistant to benzine and have a high impact strength even at low temperatures.

The moulding compositions according to the invention can be prepared in the usual mixing units, such as mills, kneaders and single-screw and multi-screw extruders. It is appropriate first to premix the polycarbonate and the polyether-imide and only to admix the remaining components in a further operation.

The present invention thus also relates to a process for the preparation of moulding compositions of (A) 95 to 50 parts by weight of thermoplastic, aromatic polycarbonates with weight-average molecular weights $\overline{M}_w$ between 10,000 and 200,000 ($\overline{M}_w$ determined by means of light scattering), (B) 50 to 50 parts by weight of thermoplastic polyalkylene terephthalate and, if appropriate, (C) 0 to 30, preferably 1 to 20 and in particular 3 to 15, parts by weight of an elastomeric polymer with a glass transition temperature of less than $-20°$ C., the sum of the parts by weight of (A)+(B)+(C) in each case being 100 parts by weight, and (D) 1 to 20% by weight, preferably 1 to 16% by weight and in particular 2 to 10% by weight, based on the sum of (A)+(D), of a thermoplastic (D) based on a polyether-imide, which is characterised in that components (A) and (D) are homogenised in a suitable mixing unit at temperatures between 290° C. and 350° C. and the mixture is then granulated, and component (B) and, if appropriate, component (C) are admixed in a further operation at temperatures between 260° C. and 290° C.

The invention furthermore relates to thermoplastic aromatic polycarbonates with weight-average molecular weights $\overline{M}_w$ between 10,000 and 200,000 ($\overline{M}_w$ determined by means of light scattering), characterised in that they contain 1 to 20% by weight, preferably 1 to 16% by weight and in particular 2 to 10% by weight, in each case based on the sum of polycarbonate (A) and thermoplastic (D), of a thermoplastic (D) based on a polyetherimide.

The invention also relates to the use of these mixtures of polycarbonate (A) and thermoplastic (D) based on a polyether-imide for the preparation of the moulding compositions, according to the invention, of (A)+(B)+(D) and, if appropriate, (C).

The moulding compositions according to the invention can contain up to 5 parts by weight, based on the total weight of components (A)+(B)+(C)+(D), of ethylene monomers or copolymers in order to increase the resistance to benzine. Ethylene copolymers in this context are polyethylenes, the radicals of which consist of, in addition to ethylene radicals, up to 30% by weight, based on the ethylene copolymer, of radicals of other copolymerisable monomers. Examples of other copolymerisable monomers for the preparation of these ethylene copolymers are (meth)acrylic acid and the monomers listed above for the preparation of the graft base and grafted-on components for polymer (C).

The moulding compositions according to the invention can contain the customary additives for polycarbonates and/or polyesters, such as lubricants and mould-release agents, nucleating agents, stabilisers, fillers and reinforcers, flameproofing agents and/or dyestuffs.

The filled or reinforced moulding compositions can contain up to 30% by weight, based on the reinforced moulding composition, of fillers and/or reinforcers. Preferred reinforcers are glass fibres. Preferred fillers, which may also have a reinforcing action, are glass beads, mica, silicates, quartz, talc, titanium dioxide and wollastonite.

The polyester moulding compositions finished with flameproofing agents contain flameproofing agents in a concentration of in general less than 30% by weight, based on the flameproofed moulding compositions.

The flameproofing agents known for polycarbonates or polyesters or elastomeric polymers are suitable, such as, for example, polyhalogenodiphenyl, polyhalogenodiphenyl ether, polyhalogenophthalic acid and derivatives thereof and polyhalogenooligo- and polycarbonates, the corresponding bromine compounds being particularly effective. They also as a rule contain a synergistic agent, such as, for example, antimon trioxide.

The moulding compositions, according to the invention, of polycarbonates, polyalkylene terephthalates and thermoplastics based on a polyether-imide and, if appropriate, elastomeric polymers and, if appropriate, the other additives mentioned can be processed to shaped articles, such as bumpers, crash bars or hub caps, and are thus used, for example, on the exterior of automobiles.

EXAMPLES

Components used

I.

Polycarbonate prepared in a known manner from bisphenol A, phenol and phosgene, relative viscosity 1.285, measured in methylene chloride at 25° C. in 0.5 g per 100 ml of solvent.

II.

Polyether-imide from Messrs. General Electric with the tradename "Ultem 1000 TM ® Resin". The product has the chemical structure shown on page 13. The number-average molecular weight is 19,200 (measured by the method of vapour pressure osmosis). The relative solution viscosity is 1.228, measured in methylene chloride at 25° C. in a concentration of 0.5 g per 100 ml of solvent.

III.

Polybutylene terephthalate prepared in a known manner from dimethyl terephthalate and butane-1,4-diol with an intrinsic viscosity of 1.18 dl/g, measured in phenol/o-dichlorobenzene (weight ratio 1:1) at 25° C. in a Ubbelohde viscometer.

IV.

Terpolymer prepared in a known manner from ethylene, acrylic acid and tert.-butyl acrylate in a weight ratio of 89:4:7, with a melt index of 6–8 g/10 minutes (measured at 190° C. under a load of 2.16 kp according to DIN 53,735) and a density of 0.924 g/cm³ (measured according to DIN 53,479).

V.

Graft polymer, 80% graft base of crosslinked polybutadiene (gel content greater than 70%, measured in toluene) and 20% grafted-on component of 72 parts of styrene and 28 parts of acrylonitrile, prepared in a known manner.

VI.

Polycarbonate of o,o,o'o'-tetramethylbisphenol A, phenol and phosgene, relative viscosity 1.29 in methylene chloride at 25° C. in 0.5 g per 100 ml of solvent.

Preparation of the moulding compositions

The polycarbonate and polyether-imide are first melted and homogenised in a twin-screw extruder under a nitrogen atmosphere at temperatures of 320° C. In a further, analogous preparation step, the remaining components and the premix are then homogenised. The molten strand is devolatilised before exit from the nozzle, cooled in water, granulated and dried. The granules are processed on an injection-moulding machine.

Table 1 contains the results.

| Example | Components in parts by weight, based on the total weight of the mixture | | | | | | Composition temperature | | $a_K$ at¹ room temperature | −40° C. | Vicat B² (°C.) |
|---|---|---|---|---|---|---|---|---|---|---|---|
| | I | II | III | IV | V | VI | Extruder (°C.) | Injection moulding (°C.) | | | |
| Comparison | 100 | — | — | — | — | — | 320 | 310 | 43 | — | 148 |
| Comparison | 90.9 | 9.1 | — | — | — | — | 320 | 310 | 37 | 8 | 150 |
| Comparison | 90.9 | — | — | — | — | 9.1 | 320 | 310 | 27 | 6 | 152 |
| Comparison | 53 | — | 40 | 2 | 5 | — | 270 | 270 | 37 | 12 | 120 |
| Example | 49 | 4 | 40 | 2 | 5 | — | 270 | 270 | 39 | 11 | 128 |
| Comparison | 49 | — | 40 | 2 | 5 | 4 | 270 | 270 | 19 | 8 | 127 |

¹$a_K$ measured according to ISO/R 179 (DIN 53,453)
²Vicat softening temperature method B, measured according to ISO 306 (DIN 53,460)

We claim:
1. Thermoplastic moulding compositions containing
(A) 95 to 50 parts by weight of thermoplastic, aromatic polycarbonates obtained from at least one of hydroquinone, resorcinol, dihydroxy-diphenyls, bis-(hydroxypenyl)-$C_1$-$C_8$-alkanes, bis-(hydroxyphenyl)-$C_5$-$C_6$-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones or $\alpha,\alpha'$-bis-(hydroxyphenyl)-diisopropylbenzenes with weight-average molecular weights $\overline{M}_w$ between 10,000 and 200,000 with $\overline{M}_w$ determined by means of light scattering,

(B) 50 to 5 parts by weight of thermoplastic polyalkylene terephthalate, (C) 3 to 15 parts by weight of an elastomeric polymer obtained by polymerizing at least two monomers selected from chloroprene, butadiene, isoprene, isobutene, styrene, acrylonitrile, ethylene, propylene, vinyl acetate and (meth)acrylate esters of alcohols having 1–8 carbon atoms, and having a glass transition temperature of less than −20° C.;

the sum of the parts by weight of (A)+(B)+(C) in each case being 100 parts by weight, characterized in that the polycarbonate component (A) contains 2 to 16% by weight based on the sum of (A)+(D), of (D) which is a thermoplastic polyether-imide of the formula

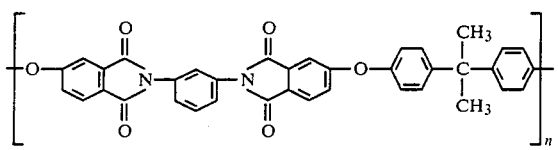

wherein "n" is the degree of polymerization, which corresponds to a number-average molecular weight ($\overline{M}_n$) of between 10,000 and 50,000 g/mol.

2. Thermoplastic moulding compositions according to claim 1 wherein the polycarbonate (A) is obtained from 4,4'-dihydroxy-diphenyl, 2,4-bis-(4-hydroxyphenyl)-2-methylbutane, αα'-bis-(4-hydroxyphenyl)-p-diisopropylbenzene, bis-(4-hydroxyphenyl) ether, bis-(4-hydroxyphenyl) sulphone and bis-(4-hydroxyphenyl) ketone.

3. Thermoplastic moulding compositions according to claim 1 wherein the polycarbonate (A) is obtained from 2,2-bis-(4-hydroxyphenyl)-propane, bis-(hydroxyphenyl)-methane, bis-(4-hydroxyphenyl) sulphone and 1,1-bis-(4-hydroxyphenyl)-cyclohexane.

4. Thermoplastic moulding compositions according to claim 1 wherein the elastomeric polymer (C) is an ethylene/vinyl acetate copolymer.

5. Thermoplastic moulding compositions according to claim 1 wherein the elastomeric polymer (C) is ethylene/propylene copolymer or ethylene/propylene/diene terpolymers.

6. Thermoplastic moulding compositions according to claim 1 wherein the elastomeric polymer (C) is a block copolymer of styrene, α-methyl styrene or vinyl toluene with butadiene or isoprene.

7. Thermoplastic moulding compositions according to claim 1 wherein the elastomeric polymer (C) is polybutadienes, butadiene/styrene copolymers and Poly-(meth)-acrylates which are grafted with styrene, acrylonitrile, alkyl(meth)acrylates or a mixture thereof.

8. Thermoplastic moulding compositions according to claim 7 wherein the elastomeric component (C) is a graft polymer of a mixture of styrene and acrylonitrile grafted onto a crosslinked polybutadiene.

9. Thermoplastic moulding compositions according to claim 4 wherein the ethylene copolymer is a terpolymer of ethylene, acrylic acid and tert-butyl acrylate.

10. Moulding compositions according to claim 1 comprising components (A)+(B)+(D) and (C), which also additionally contain ethylene homopolymers or copolymers, lubricants, mould release agents, nucleating agents, stabilisers, fillers, reinforcers, flame-proofing agents or dyestuffs.

11. Process for the preparation of the moulding compositions of claim 1 wherein components (A) and (D) are homogenised in a suitable mixing unit at temperatures between 290° C. and 350° C. and the mixture is then granulated, and component (B) and componet (C) are admixed in a further operation at temperatures between 260° C. and 290° C.

* * * * *